United States Patent [19]

Sundén et al.

[11]  4,183,783

[45]  Jan. 15, 1980

[54] SEMISYNTHETIC PAPER STRUCTURE ON A UREA BASIS

[75] Inventors: Olof Sundén, Snickarvägen 22, 181 46 Lidingö, Sweden; Birgitta Sundén, Lidingö, Sweden

[73] Assignee: Olof Sundén, Lidingö, Sweden

[21] Appl. No.: 835,342

[22] Filed: Sep. 21, 1977

[30] Foreign Application Priority Data

Sep. 21, 1976 [SE] Sweden .............................. 7610444

[51] Int. Cl.² ............................................. D21H 3/54
[52] U.S. Cl. .................................... 162/166; 162/167; 162/181 A; 162/181 C; 162/181 D; 71/28; 71/29
[58] Field of Search ........... 162/166, 167, 146, 181 D, 162/181 A, 181 C; 260/39 R, 39 SB, 2.5 F; 71/28, 29

[56] References Cited

U.S. PATENT DOCUMENTS

| | | | |
|---|---|---|---|
| 2,582,840 | 1/1952 | Maxwell | 162/166 |
| 3,004,884 | 10/1961 | Eberl et al. | 162/166 |
| 3,497,373 | 2/1970 | Rieck | 162/166 |
| 3,912,532 | 10/1975 | Simone | 162/181 D |

FOREIGN PATENT DOCUMENTS

1338759  11/1973  United Kingdom ..................... 162/169

*Primary Examiner*—S. Leon Bashore
*Assistant Examiner*—William F. Smith
*Attorney, Agent, or Firm*—Wenderoth, Lind & Ponack

[57] ABSTRACT

A semisynthetic paper with low bulk comprises a continuous, chemically bonded, open fibre network formed by cellulosic vegetable fibres and fragments of urea-formaldehyde condensate, the fragments being precured before paper web formation and being cured a second time when drying the paper web.

A method of producing a semisynthetic paper with low bulk comprises the steps of forming precured fragments of a urea-formaldehyde condensate, forming a stock of the fragments and cellulosic vegetable fibres, including in the stock a water-insoluble latent curing agent, forming a paper web from the stock, and drying the paper web, the fragments being cured a second time during the drying operation.

11 Claims, No Drawings

SEMISYNTHETIC PAPER STRUCTURE ON A UREA BASIS

The present invention relates to a semisynthetic paper structure composed of a continuous and chemically unified network of cellulosic, vegetable fibres together with solid fragments of urea formaldehyde condensate. The new paper structure displays good strength properties and particularly good wet-strength properties as well as excellent optical properties. The paper structure which will hereinafter be referred to as "urea paper" is produced by combining, in a stock, cellulose and/or wood fibres with solid fragments or particles of urea formaldehyde condensate which, in this solid form, has a remaining methylol reactivity which is activated by thermal and catalytic action during the drying process which follows on the conversion of the stock to paper sheets.

A characteristic feature of the invention is that urea paper can primarily be used as printing or wrapping paper and secondly in the form of waste paper as a fertilizer with a high content of organically bonded nitrogen, up to something over 20% N.

It has long been known in the art to use urea-formaldehyde resins in soluble/colloidal form as additives in paper manufacture for obtaining so-called wet-strength paper. To this end, up to from 6 to 7% of a water-soluble ionic urea formaldehyde resin is added to the paper stock. It is also known to use insoluble resin powder as a filler in paper. Thus, DAS No. 1,047,604 and U.S. Pat. No. 3,004,884 and 3,210,239 describe the use of ground urea-formaldehyde cellular plastic as chemically inactive filler and bulk agent for obtaining voluminous and porous paper structures.

As opposed to prior art techniques, the present invention relates to the use of solid urea-formaldehyde fragments in chemically reactive form, the fragments, during the drying process of the paper, reacting (curing) with each other and probably with the cellulose to form an open, chemically bonded fibre network of low bulk (high density) and good strength. The invention differs further from the prior art relating to the manufacture of cellulose-filled urea-resin compression moulded articles in that an open and permeable network structure (paper structure) is obtained, whereas, in compression moulding, a compact, nonpermeable compression moulded structure is obtained by the selection of higher methylol reactivity and more intensive reaction conditions. Finally, the present invention differs from the prior art in that urea-formaldehyde condensate at the same time constitutes a predominant fraction of the raw materials and a functionally structure-bonding component in paper manufacture.

The most important object of the present invention is to produce a semisynthetic paper product composed of cellulosic, vegetable fibres together with solid fragments of urea-formaldehyde resins, chemically bonded to form a continuous open network with partially unique properties as paper, at a production cost which is favourable as compared with that of existing paper products.

A further object of the present invention is to supply the market with a semisynthetic paper product composed of such an amount of urea in intimate combination with cellulosic, vegetable fibres that the product, in form of waste paper, may secondarily be used as a nitrogen-containing fertilizer. In this context, it is also an object to design the product such that it is particularly suited for such double use, as well as to utilize valuable raw materials such as urea and cellulose twice, first as paper and then as fertilizer.

Still a further object of the present invention is to devise a suitable manufacturing process for urea paper, in which the formation of a continuous, chemically bonded network of high density is promoted, as opposed to the case in prior art technique, according to which solid fragments of urea-formaldehyde condensate are physically disposed in the paper structure as a chemically inactive filler and thereby contribute to high bulk. An aim is also to devise a manufacturing process such that the product receives high-quality paper properties at the same time as receiving high-quality fertilizer properties.

Other objects and advantages inherent in the present invention, whose characteristics are disclosed in the subsequent claims, will be apparent from the following description and Examples.

It may seem surprising that it has not earlier been discovered that it is possible to produce two completely different types of paper with the aid of urea-formaldehyde fragments and cellulose. Only the bulky, porous and weak type has hitherto been described, for example, in the above-mentioned references, whereas the stronger type with high density has not hitherto been known to the art. This is because the international standard developed for the test production of paper in laboratories does not offer the chemical and physical conditions required for the development of a continuous network structure of high density and strength. For example, according to international laboratory test standards, paper drying is effected at 23° or 60° C. (TAPPI standard and English standard, respectively), which is insufficient for realizing the requisite reaction. Furthermore, no such catalytic additives occur as are required according to the present invention for achieving the requisite reaction pH. Although these requisite premises are not included in any laboratory test standard, they are easy to realize in technical paper production, which will be apparent from the following explanation.

The invention is based primarily on the discovery that solid and water-insoluble fragments, already cured by means of acid at temperatures under 60° C., of urea-formaldehyde condensate in the form of cellular plastic (foam), film or fibres, as well as suspendible particles of such condensate, can react with each other and probably with cellulose fibres to form a strong, open, bonded and continuous fibre network under special drying and curing conditions. The most important drying and curing conditions are a temperature in excess of 80° C. and a pH which does not exceed 4.5. Temperatures above 140° C. are unsuited both to cellulose and urea-formaldehyde condensate. Similarly, at pH levels of less than 1.5, undesirable hydrolysis reactions take place, for which reasons these temperature and pH ranges constitute limit values for practical use.

Urea-formaldehyde condensate can vary greatly with respect to its methylol reactivity, dependent upon the molar formaldehyde/urea ratio, designated below F/U, and on the condensation degree and condensation method. Methylol groups, $-CH_2-OH$, are formed primarily on the reaction of the urea with formaldehyde but in partially cured condensates and resins they occur substantially as end groups. Condensates with a high F/U ratio, for example above 1.5 give, as well as a low condensation degree, an increased content of methylol groups and thereby a higher methylol reactivity. During continued condensation (or curing) the mol weight of the condensate/resin increases by the reaction of the methylol groups with amine end groups, —CO—NH$_2$, to form methylene bridges, —NH—CO—NH—CH$_2$—NH—CO—NH—, and by reaction between two methylol end groups to form a so-called ether bridge, —NH—CO—NH—CH$_2$—O—CH$_2$—NH—CO—NH—. The content of the ether bridges increases with the F/U ratio and it is considered probable that this content also increases with acid condensation in cool conditions as compared with warm condensation, since either bridges in warmth seem to convert to methylene bridges during the splitting off of formaldehyde and formation of new methylol groups. Unfortunately, the chemical processes under varying curing conditions have not at all been scientifically clarified. According to observations made during work on the present invention, it is important that the cured insoluble resin condensate which was primarily formed by acid curing (pH 1.0–3.5) at a temperature of less than 60° C., preferably 5°–40° C., be given the opportunity for a second curing in warm conditions (from 80° to 140° C.) under the influence of pH-lowering additives in conjunction with drying of the paper web, hence in the presence of cellulosic, vegetable fibres. This second curing of already acid cold-cured urea-formaldehyde resin fragments in intimate contact with cellulose in conjunction with drying and heat treatment of the paper web is, thus, a prerequisite for the realization of this invention.

The acid cold curing should not, however, be persevered with too far, since the resin fragments in such an event lose their reactivity to the level that a second curing in heat cannot be carried out, which manifests itself in a loss of strength in the urea paper. For certain urea resin types, an inactivation of the heat curing occurs as early as after 6 to 12 hours of cold curing at pH 1–3, whereas other resin types do not lose their recuring capacity until after from 48 to 96 hours of cold curing. There are good scientific grounds for assuming that all curing or condensation is united with methylol reactivity, that is to say reactions in which methylol groups participate and are consumed. Moreover, it is proved that the number of methylol groups is reduced continuously with increasing condensation/curing. Since ether bridges can be broken up in heat under the formation of formaldehyde and new methylol groups, the expression "methylol reactivity" is taken below to mean the total capacity of the urea-formaldehyde condensate to be cured in heat a second time by methylol reactions and new formation of methylol groups. The phrase "condensate:B-stage" is often used in the literature in the art for condensates which have changed to solid form but still retain a methylol reactivity such that they can be cured in heat a second time. A short acid treatment at pH 1–2 just before drying and a second curing also reactivates the methylol reactivity by degradation of ether bridges if the fragments have been stored and inactivated at higher pH.

From the scientific point of view, it is still a matter of dispute as to whether cellulosic, vegetable fibres react chemically with urea-formaldehyde condensate during the curing of, for example, moulding materials. One theory sets out to explain the bonding of cellulose as an encapsulating of the cellulose fibres in urea resin particularly in the intersections of the fibres so that these cannot be separated or swelled in water. However, according to observations made during the development of the present invention, such a strong bond is formed between the cellulose and urea resin on the second curing of the latter during the paper drying that the designation "chemically bonded network" has here been selected. Nevertheless, the invention is independent of the question as to whether this chemical bonding may only be related to the mutual reaction of the urea resin fragments and a "physical locking" of the cellular fibres or if a chemical bond also occurs between urea-formaldehyde condensate and cellulose. The following points which constitute particular features of urea paper according to the invention seem to speak for a very strong and probably chemical bond between urea-formaldehyde condensate and cellulose; hydrogen bonds cannot explain these effects.

A. Urea paper which is treated with very strong soda lye (20–40% aqueous solution) does not go to pieces as a normal paper but swells to a product like chamois leather, with considerable strength.

B. Urea paper is totally insoluble and is not influenced by the enzymes which are present in rumin secretion and which break down cellulose as well as urea-formaldehyde condensate when these are batched separately into such a secretion liquid. Thus, the cellulose will also be inactivated by strong mutual bonding to the urea-formaldehyde condensate.

C. Paper structures composed of urea resin fragments and other fibres than vegetable cellulose, for example fine mineral wool fibres, in the same manner as urea paper according to the invention will be of highly insignificant strength and break up both in a soda lye solution and in pure water.

Thus, as regards fibres which, granted, lack the capacity to react with urea-formaldehyde condensate, no durable paper structure will be obtained, even if fibre encapsulation should also take place in this case.

To sum up the reactivity and curing conditions which are required in paper drying for effective curing a second time in heat to a continuous fibre network structure of the already cold acid-cured urea-formaldehyde condensate together with cellulose, the following points can be put forward:

1. The fragments must, despite earlier acid curing within the pH range of from 1.0 to 3.5, have a remaining methylol reactivity, at least on the surfaces.
2. A certain minimum temperature must be achieved during the drying process, while the paper web is still moist, to obtain curing reactions with the extant and newly-formed methylol groups. This minimum temperature lies at 80° and preferably 100° C.
3. The stock of urea fragments and cellulosic, vegetable fibres must contain a special, water-insoluble, latent curing agent which, during the drying process, lowers the pH of the paper web to a value below 4.5, preferably between pH 2 and pH 4.
4. The wet urea paper sheet should, prior to drying, suitably be subjected to pressing, for example, between rollers, corresponding to a pressure of from 50 to 150 kp/cm$^2$ and it is, furthermore, suitable to maintain the compression of the moist sheet during the drying process by means of high felt pressure or an addition of compacting sizing substances. These pressing conditions are normally maintained both in technical paper manufacture and in laboratory work, for which reason they appear here as less critical. The aim with the pressing operation is to increase the contact between the solid reaction components, that is to say the fragments and cellulose fibres.

In the preceding description, the solid urea-formaldehyde condensate which, together with cellulose, constitutes the major raw material for urea paper, has been designated fragments. These fragments can, in their geometric shape, be fibrous, flake-formed or generally particulate. They can be produced in a similar manner as synthetic fibres by spinneret spinning or as plastic films which are then fragmented. They may also be obtained in particulate form by the precipitation of urea-formaldehyde resin from an aqueous solution. Since it is extremely difficult by conventional methods to obtain urea-formaldehyde condensate in solid fragmentary form which is not tacky in an initial stage and forms unmanageable lumps on mechanical handling which later cause "grits" in the paper, a few suitable processes for the manufacture of manageable fragments will be given below:

One fragment form which advantageously can be utilized in the application of the invention is fragmented foam (cellular plastic) of urea-formaldehyde resin (U-F resin) which has been exposed to acid curing in air-foamed form for a limited time. The foam structure (cellular plastic structure) should have stabilized and cured to a water-insoluble, non-tacky form which is nevertheless still reactive and curable a second time at higher temperatures during the paper drying operation when it is fragmented in, for example, a so called hydropulper. The technique of producing F-U resin foam for insulation purposes is old in the art, for which reason only one variation will be described which is well suited for further processing to urea paper.

The suitable starting point is U-F condensate which is so water-soluble that it stands dilution to about 20% resin concentration in water. This dilutability with water reduces with the methylol content in the condensate, for which reason low F/U ratios and advanced condensation both contribute to low water dilutability (deposition as a tacky mucus in diluted aqueous solutions). For insulation foam, use has previously been made of U-F resins with high F/U ratios about 1.7–2.1, but in order to avoid problems with formaldehyde splitting-off from the finished product, it is, in this case, desirable to maintain a lower F/U ratio and reduce the primary condensation. F/U ratios down to 1.3 have proved to be usable for reprocessing to urea paper, and even lower F/U ratios can be used if different resins are mixed so that the cell surfaces obtain a higher F/U ratio than the inner portion of the cell walls.

A step which has been found to be particularly valuable in urea paper manufacture is an admixture of inorganic filler such as kaolin, talc or aluminium oxide hydrate in the resin solution which is to be foamed. In this case, the filler should be first suspended in water containing some water-glass or other silicate, corresponding to from 1 to 10% of $SiO_2$ calculated on the filler, which to a great extent is absorbed on the surfaces of the filler.

The kaolin amount can be up to between 10 and 100% of the resin amount.

Several advantages are gained by means of such an admixture of silicate treated filler, in particular kaolin and talc which are often used in paper manufacture. First, such filler with a particle size of from 0.1 to 5.0 $\mu m$ collects in the thicker partitions of the foam structure, these partitions delimiting three and more bubbles from each other, whereas the single walls which separate two bubbles from each other become so thin that, during the cold acid curing (see below) they are punctured and contract so that only a network of the coarser fibre-like parts remains. Secondly, the raw material for urea paper is made cheaper and the paper receives a higher level of opacity which is a valuable property. Finally, silicate on the particle surfaces of the filler is converted to active silicic acid gel which gives the foam fragments an anionic character whereby they receive higher retention to cellulose and become easier to catch on the wire in the paper formation, at least to the extent Al sulphate is included in the stock. Otherwise, the foam manufacture proceeds in the following standardized manner.

A 20–40% solution of a urea-formaldehyde condensate is converted to a foam (lather) with the help of compressed air and a tenside (for example butyl naphthene sulphonate, nonyl phenol sulphonate or lauric sulphonate) in solution together with an acid curing agent, normally about 4% phosphoric acid. The primary "soap lather foam" is converted successively into a rigid non-fluid foam as the urea-formaldehyde condensate distributed on the foam bubbles is cured to a solid resin under the action of the pH value which preferably can lie between 1.0 and 3.5 immediately after the foaming process. The dry density of the foam is adapted normally to from 10 to 30 $kg/m^3$ by means of the amount of air. The foam formation and precuring take place at a temperature of less than 60° C., preferably from 5° to 40° C. Depending upon the character of the resin condensate which is used, after from 2 to 50 hours the precuring has proceeded so far that the foam can be ground in a hydropulper without lumping to compact portions for further reprocessing to urea paper. No drying of the resin foam is required and treatment at raised temperature, above 60° C., before the pulping is directly unsuitable for the properties of the urea paper. In conjunction with the pulping, the pH is adjusted upwardly and the cold acid curing is discontinued.

Those foam fragments which are obtained on the pulping and grinding of a precured foam prove, on examination under the microscope, to consist of branched fibre structures with extremely thin lamellae which unite the fibre branches like webs. The thickness of the fibre branches and lamellae is determined by the properties of the foam structure, for example its density and bubble size. In the grinding process, only the bubble or foam structure is broken up and the branched fibre structures are shortened. In order, in the paper drying, to obtain a strong and continuous network structure, the bubble structure proper must be ground down. The fibre length of the resulting mass is of minor importance for the strength of the finished paper, since fibre lengths of less than 100 $\mu m$ can be difficult to catch in the wet end during the paper formation, unless kaolin and anionic silicic acid gel are included in the fragments.

Fragments of thus prepared foam function very well for further processing to urea paper. The only difficulty is that the tenside used for the foaming process is harmful to an even paper formation on the wire of the paper machine. This must, therefore, be rinsed off after the fragmentation/pulping of the foam or rendered harmless in some other way.

It is a characteristic feature of the invention that the urea-formaldehyde component need not be converted in its entirety to precured foam. Such foam has, within the density range of from 10 to 20 kg/m$^2$ such an over-dimensioned surface that this can be used for the precipitation of large amounts of soluble or suspended urea-formaldehyde condensate. In such a manner, the surface reactivity of the fragments can be reinforced and moderated. Apart fom sulphite modified resin, unmodified resin with a low F/U ratio of 1 or less can advantageously be precipitated (monomethylol urea and oligomers thereof). A suitable precipitation agent is, in this context, acidic oligomer silicic acid which has a precipitating effect as a result of strong hydrogen bonds vis-à-vis urea derivate and methylol urea. As much as up to from 50 to 70% of the total amount of urea-formaldehyde condensate can in this way be supplied to the paper as not previously cured solution precipitate or suspension precipitate, whose degree of precuring will be low since the precuring is effected during the pulping stage. Similarly, the large surface of the foam fragments constitutes a suitable deposition base for fillers such as kaolin and titanium dioxide. Suspensions of resin with low F/U ratios must, naturally, have a low condensation degree in order to be able, by methylol reactions, to combine with the remaining fibre structure and, in such an event, they can be incorporated without any weakening of the paper structure.

U-F condensates with low F/U ratios between 1.0 and 1.3 and low condensation degree can also advantageously be precipitated on filler such as kaolin and talc. A very low-condensed solution of urea and formaldehyde with F/U of between 1.0 and 1.3 precipitates easily on the acid side at pH 3–5 on suspended kaolin or talc and also here oligomer silicic acid (manufactured from water-glass by rapid acidification) constitutes a suitable precipitation agent, in particular if the condensate is cationic, for example by an addition of ammonia. A coating of the kaolin particles with 20 to 40% U-F condensate gives a filler which can be admixed into the cellulose stock in amounts up to from 50 to 70% calculated on the total of the cellulose fibres and U-F resin-modified kaolin. Direct use can also be made of precipitates of U-F condensate with low F/U ratio and low condensation degree without any base substance for the precipitation, but, for economic reasons, such a base as kaolin is to be preferred. It is also suitable in the case of precipitated fragments to subject the precipitate—fragments—to a precuring with cold acid at pH 1–3 for from 30 to 180 min. just before they are admixed to the cellulose stock. Such a precuring with acid activates the second curing in conjunction with the drying of the urea paper, at the same time as it reduces the dissolution of the precipitate in the highly diluted stock.

Concerning the configuration of the fragments, it might be mentioned in conclusion that it is possible by foaming and spinneret spinning processes to obtain fragments in which the surface layers are richer in methylol than the inner layers. This is achieved by mixing, before the foaming or spinning, methylol-poor and sparely soluble resin in methylol-rich resin, the first-mentioned substance being concentrated to the inner regions of the obtained fibrous product, whereas the methylol-rich resin portion is concentrated to the outer surfaces.

As will be apparent from the above, the U-F resin fragments may vary within broad limits both as regards method of manufacture and final form. The fragments can be homogeneous of U-F resin but they can also be heterogeneous with a core material of, for example, kaolin and talc. As far as dimensions are concerned, they can vary from U-F resin covered kaolin of from 1–5 $\mu$m up to fibrous fragments of foam or spun fibres with "fibre diameters" of from 5 to 100 $\mu$m and "fibre lengths" of from 100 to 1000 $\mu$m. The fragments can be ionic, for example cationic, by condensation in the presence of ammonia, amines, or anionic by condensation in the presence of sulphite ions. The ionic character may also derive from ionic substances included in the fragments such as active silicic acid. A decisive factor for the present invention is that the U-F resin fragments are precured to water insolubility by acid curing in such a manner that a second curing to new structure can be effected under the drying conditions of the urea paper.

Apart from the precuring level and remaining methylol reactivity in the U-F resin fragments, the temperature in the second curing, that is to say the drying temperature of the urea paper, is of decisive importance. This temperature must lie above 80° C., which the drying temperature in general does in technical paper manufacture. In order rapidly to reach a drying temperature of from 80° to 100° C. in the paper web, it is advantageous to keep a slightly higher temperature at the drying rollers than is normally the case and also to provide the paper machine with more stable and less vapour permeable drying felts than is normally the case, this in order that the water vaporization take place at the highest possible temperature while maintaining a high pressure from the felts. The second curing proper need not necessarily take place on the paper machine; it can advantageously also take place in the subsequent warm calendering or other after-treatment of the urea paper.

Since, in paper manufacture, it is not normally desirable to work with a stock pH of lower than 4.5, and since urea paper requires a lower pH in conjunction with drying, a so-called latent curing agent should be added as early as the pulping and stock manufacture. Unfortunately, it is not possible to use normal latent curing agents for urea moulding materials in this case, since they are constituted of ammonium salts or toluene sulphonic acids which are far too soluble in the great quantities of water in the stock.

In principle, any water-insoluble, latent curing agent whatsoever can be used, but two such curing systems have proved to be of particular interest. The simplest of them relates to acidic aluminium hydrogen phosphate which is obtained by precipitation from solutions containing Al ions, for example Al sulphate and phosphoric acid within the pH range of from 3.5 to 5.0. This curing agent is formed automatically if the U-F condensate had been precured with phosphoric acid, which is normal in foam curing, and the pulped foam is supplied with Al sulphate in a manner which normally occurs in paper manufacture, and that the primarily highly acidic stock is neutralized to a pH of from 4.5 to 5.0. On the addition of Al sulphate and the subsequent pH increase, acidic aluminium hydrogen phosphate will preciptitate out on the fragments (and cellulose fibres). When the moist paper web later comes into the drying section and the temperature increases, the Al hydrogen phosphate is disproportionized in neutral Al phosphate and free phosphoric acid which lowers the pH of the paper web to between 2 and 4 depending upon concentration. When the ready-cured paper later cools, a certain return of the pH level to between 3 and 5 takes place. The amount of Al which is required corresponds to from 0.1 to 1.0% of the paper weight calculated as $Al_2O_3$, whereas the phosphoric acid should be present in double the amount or from 0.2 to 2.0% calculated as $H_3PO_4$.

The second curing system which has been found to be of particular interest is U-F resin per se in the form of sulphonic acid in its acidic hydrogen form. Most suitably, this curing agent is prepared in that a portion of U-F condensate solution (without precuring) is supplied with an alkali sulphite, for example pyrosulphite. The sulphite then reacts with methylol groups and ether bridges to an acidic U-F sulphonate. The U-F sulphonic acid is insoluble on the acid side and can, therefore, be precipitated on already prepared fragments of precured U-F resin, which should take place at pH of between 1 and 3. A product is then obtained in the form of stock which can be neutralized to the desired pH of from 4.5 to 5.0 without the insoluble sulphonic acid seeming to be neutralized. In the drying process, it will, however, be activated by the raised temperature, for which reason the pH of the paper sheet falls drastically. An indicator colour dropped onto the sheet can indicate pH levels of from 1.5 to 2.5 at a drying temperature of 80° C. but the pH level increases of its own accord on cooling to more normal values of between pH 3.5 and 4. In order to obtain a U-F resin sulphonic acid it is advisable to batch a sulphite amount corresponding to 1 mol $SO_2$ to 5 mol urea in a U-F resin. The thus obtained U-F resin sulphonic acid can be precipitated on already prepared fragments to an amount corresponding to from 10 to 40% resin sulphonic acid calculated on the total amount of U-F resin. On the other hand, it has proved difficult to realize a satisfactory foam of U-F condensate which, prior to the foaming, contains U-F resin sulphonic acid. Clearly, this sulphonic acid retards the foam curing so that the tenside foam collapses before the curing reaction has given the foam sufficient rigidity and stability.

It has been intimated above that fragmentation and dispersion of the U-F resin precured at a temperature of below 60° C. can advantageously take place in a so-called hydropulper where also cellulosic, vegetable fibres are broken up and dispersed in the normal manner. In the pulping, those ingredients are added which are necessary for pH-lowering during the drying of the urea paper web. The resultant pulp can consist of up to from 70 to 80% of U-F fragments inclusive of accompanying filler and from 20 to 30% of cellulose fibres. If only about 10% cellulose is present, a less paper-like web is obtained with increased rigidity and brittleness. In contents of less than 20% of U-F resin fragments, the urea paper more and more loses its unique properties as defined below and becomes more and more like normal paper consisting of only cellulosic, vegetable fibres.

The cellulosic fibres in urea paper may be of the sulphate cellulose type, sulphite cellulose, mechanical pulp, thermomechanical pulp and semichemical pulp. Long fibres from coniferous wood are to be preferred, but short deciduous wood fibres can also advantageously be used. They can be bleached or unbleached. The requirement on the beating degree of the cellulose is similar for urea paper as for conventional paper. Since the U-F resin fragments are beaten to small dimensions much more easily than the cellulose is beaten to defibrated fibres, it is advisable to subject the included cellulose to a separate prebeating, for example in a refiner. The combined stock of U-F resin fragments and cellulose should, however, be subjected to a joint final refining, whose intensity should, however, be adapted with respect to the U-F resin fragments which are more beat-sensitive.

After drying, the urea paper can be calendered and treated in the conventional manner. The calendering process can also be utilized for the second curing.

The urea paper with from 30 to 70% U-F resin fragments which is obtained according to this technique is characterized in that it consists of a chemically bonded and continuous but open fibre network as opposed to normal paper which consists of separable fibres united by so-called hydrogen bondings. The difference in the bonding can be demonstrated in a striking manner by the behaviour of the different paper structures in 20 to 40% soda lye. In the strong lye, the hydrogen bondings of the normal paper are broken, the cellulose begins to mercerize and the fibres float apart to a non-continuous mass. The same happens with paper containing inactive filler of urea-formaldehyde condensate in accordance with prior art techniques. Urea paper according to the invention behaves in a completely different way. The paper merely swells in the strong lye and assumes rather the character of a water-swelled skin or a wet chamois leather, but considerably stiffer. This swellability with retained high strength seems to be decisive proof of the durable chemical bondings in the continuous fibre network.

Consistent with this structure, urea paper has a relatively high dry strength corresponding to that of high-quality cellulose paper (3000–6000 m). It is noteworthy that the wet-strength is high. The wet breaking length (tensile strength) lies normally at from 25 to 60% of the dry breaking length, normally above 33%. The tear index according to Elmendorf is also high in view of the very short urea fibres which are included as a structural element in the urea paper structure (approx. 80–160 $dm^2$). The Elmendorf tear index is a good measure of the length of the included fibres and it is, therefore, proof in this case that a continuous fibre structure has been built up. The short urea resin fragments should as such have realized a totally unsatisfactory tearing resistance, which is also the case when the fragments are included as inactive filler according to prior art techniques. Even the wet tearing resistance is, naturally, very high for a well designed urea paper. Normally, the wet tear index lies at from 50 to 90% of the dry tear index for urea paper. In the following Examples, the dry and wet tear indexes have been taken as a measure of how well the urea paper structure was built up in different experiments. Of the dry tear index values given in the Examples, values under 40 can be considered as disclosing faulty build up of the network structure, which is also valid for wet tear indexes under 20. When the urea-formaldehyde condensate is present as totally inactive filler in contents of 50% and above, dry tearing resistance values of only 8 to 16 and wet of 0 to 4 were obtained.

The chemically bonded and continuous fibre network structure in urea paper is also characterized by low bulk or high density as opposed to paper with inert filler of urea resins which throughout have high bulk. According to patent literature in the art, the bulk increases by about from 0.3 to 0.4 $cm^3/g$ for each admixture amount of 10%. As regards admixture of active urea resins according to the invention, the bulk does not increase at all as compared with paper of 100% cellulose (cellulose of corresponding beating degree) or in any event not more than 0.1 $cm^3/g$ per 10% admixture, which can be calculated from the disclosures given below in the Examples.

As would seem to be apparent from this detailed description, "urea paper" according to the invention represents a novel product with interesting properties which make it usable for purposes where the product is not normally considered as paper. Because of its strength and wet strength, it can, for example, replace textiles as backings for plastics and as polishing cloths, for which reason the invention is not restricted to paper products in the traditional narrow sense of the word.

As regards the secondary use of the product as fertilizer and soil improver, the waste paper should be shredded, suitably in a wet-shredder so that a coarse fibre slurry is obtained. Fertilization experiments have shown that the best results and the most rapid nitrogen utilization are obtained if this slurry is made alkaline to pH about 9 with quick lime or an addition of ammonia before the spreading operation. The nitrogen will then be more easily available to micro-organisms. Thanks to the intimate mixture with cellulose, micro-organisms utilize the product much more rapidly as compared with foam of urea resin only. The microbiological attack is very rapid in the soil whereas a moist mass of urea foam fragments only keeps for months. Thus, there is here an unexpected synergetic effect between the urea foam component and the cellulose finely divided therein. The content of phosphates in urea paper waste (up to about 2% $P_2O_5$) also contributes somewhat to the fertilizer value, even though this is present as Al phosphate which is not readily available.

In the manufacture of paper it is of importance to be able to re-use such paper as has been incorrectly treated on the paper machine or rejected in the rewinding process etc. For urea paper which has not dried and been recured this can be done in the traditional manner. Dried urea paper, like urea waste paper which is to be re-used for paper must first be shredded and defibrated in the usual manner, although this is more energy-consuming because of the extraordinary wet strength of the paper. If minor amounts of defibrated waste are mixed into a fresh urea paper stock, the re-use functions without difficulty. When larger admixture amounts are called for, it must be taken into account that methylol reactive resin should be added, for example, by precipitation of acidic sulphite-modified U-F resin with a high F/U ratio or other latent curing agent for reducing the pH during the drying process to pH 4 and less.

EXAMPLE 1

This Example illustrates the shift of bonding activity and pH during storing of cold acid-precured F-U resin foam. Two equivalent urea resins intended for the manufacture of insulation foam with an approximate mol ratio F/U=2 (manufactured by Casco, Sweden and BASF, Germany) were taken as spray-dried powder. The resins were dissolved in water and allowed to stand for 48 h, when 12% urea was added calculated on the resin weight, whereafter they were allowed to stand a further 24 h for bonding of the urea. The new F/U ratio was then 1.7. Foaming took place in a so-called foam gun which is normally used for insulation foaming. In this, a curing agent solution of 3.5% phosphoric acid containing a tenside (Na-butyl-naphthene-sulphonate) was foamed up by means of compressed air and a finely divided mist of the above resin solution, diluted to 32%, was sprayed into the foam mass. The amount of air and curing agent acid was adjusted such that the density (in dry form) of the obtained foam was 15 kg/m³ and the pH of the foam mass was 2.3. The first-obtained foam cured within 5 min. to a solid, non-fluid but still soft and tacky foam (the Casco resin was slightly slower). The foam was allowed to stand overnight without drying at 20° C. and, after 16 h, a first sample was taken for pulping and further reprocessing to paper.

2 g of foam material (calculated on the dry weight) was beaten together with 1 g bleached pine sulphate cellulose (Iggesund fluff) in a high-speed laboratory mixer, whereafter the primary pulp suspension was filtered off and washed for the removal of free acid and tenside which have a disturbing effect on the sheet formation. The pH of the primary pulp suspension was noted in accordance with the Table below and the secondary pulp suspension, from which the paper was formed, was supplied with 3% Al sulphate calculated on the weight of paper, which gave the pulp a pH of approx. 4.5 (please note that the phosphoric acid had been washed off). The Table below shows how the methylol reactivity and pH of the foam changed with time. In this case, the fall-off of the methylol activity can also be followed with the rising pH level of the primary stock, but this is not possible in the presence of latent curing agents.

From each sample sheets were manufactured with a sheet weight of 100 g/m² and, for assessing the quality of the paper obtained, the tear index was determined in accordance with Elmendorf in dry and wet state (after at least 12 h storage of the paper). The tear index was measured

| Storage time for acid-cured foam | pH primary stock | pH dried paper | Dry tear index | Wet tear index |
| --- | --- | --- | --- | --- |
| 16 h | 2.8 | 3.2 | 96 | 80 |
| 30 h | 3.2 | 3.5 | 80 | 64 |
| 54 h | 3.6 | 4.1 | 72 | 56 |
| 78 h | 4.0 | 4.3 | 60 | 44 |
| 102 h | 4.2 | 4.4 | 36 | 20 |
| 126 h | 4.7 | 4.8 | 24 | 8 |
| 150 h | 5.0 | 5.0 | 16 | 4 |
| 1 month | 5.5 | 5.0 | 12 | 0 |
| 1 month acid drying | 5.5 | 3.0 | 48 | 24 |

In the last-accounted for sample, the formed and pressed-off sheet was moistened with a tataric acid buffer with pH 2.0 prior to the drying, so that the drying was carried out at pH 2.0–3.0.

For further illustrating the importance of the pH function, the above sample was doubled after 30 h so that a parallel sample was neutralized in the primary pulp suspension to pH 8.5 and maintained at this pH for 3 h before it was washed and repulped in the disclosed manner with an addition of Al sulphate to pH 4.5 in the secondary pulp suspension. The result was a paper with a considerably reduced bonding corresponding to a dry tear index of 32 and a wet of 16. An alkalization of this type should not reasonably have affected methylol content or methylol reactivity, for which reason it is justified to draw the conclusion that the "inner" pH of the resin foam, which need not be identical with the pH of the pulp suspension (aqueous phase), is of decisive importance for the chemical bonding and the build-up of the network structure.

EXAMPLE 2

This example illustrates the effect of the foam drying on the bulk.

A water-soluble carbamide resin with a mol ratio carbamide/formaldehyde 1:2.1 and condensed to a degree at which dilution with 1.5 parts of water gives deposition at 20° C., was diluted to 29% dry content and 15% carbamide, calculated on the dry resin content, was added to this solution. A resultant F/U of 1.7 was obtained. After storage for 2 days at pH 8-8.5, the solution was supplied with 25% kaolin which had first been suspended in a 3% water-glass solution. The volume was adjusted so that the carbamide resin solution with suspended kaolin displayed a dry content of 32%. Of the total dry content, approximately 20% was water-glass-treated kaolin (qual.B).

From the resin solution, carbamide foam was produced by means of a foam gun in accordance with Example 1. In this instance, the resin solution was sprayed in aerosol form onto a foamed solution of butyl naphthene sulphonate and phosphoric acid. Compressed air was used as the foaming agent. The components were mixed in such proportions that the pH of the mixture was 2.5. However, the pH level rose progressively during storage so that after 3 days it was 3.5.

Attempts at mechanical processing of the obtained foam and at disintegration thereof immediately after production and after 12 h resulted in the formation of compact resin particles which gave a grainy unusable paper. After 48 h, the foam could be disintegrated in a hydropulper (aqueous phase) to fine fibre fragments which, after washing together with 33% cellulose (pine sulphate), gave an even and strong paper of pH 4. The dry tear index on sheets was 60 according to the Elmendorf Tearing Test. The corresponding wet tear index was 48. The paper had a bulk of 1.3 cm$^3$/g. These results were achieved with foam which did not dry during the two days' storage. The same result was, however, obtained with a smaller sample which had been stored for 2 days in a vacuum at 27° C. and dried. On the other hand, one sample which had dried at 75°-80° C. for 12 h during a pH rise to 5.5, displayed considerably reduced paper formation capacity. The dry tear index on sheets was only 20 and the wet tear index 6. The bulk was 2.6 cm$^3$/g. This comparison shows that it is not the drying itself of the foam but the heating and after-condensation, that is to say loss of methylol groups, which reduces the paper formation capacity. No special steps were necessary in order to obtain a homogeneous and satisfactory paper formation on the wire other than to wash the pulp free of surfactants.

After 6 days' storage at a pH of 4.5, the foam showed a markedly reduced paper formation capacity. The disintegration caused no problems but the paper obtained became steadily more voluminous and displayed a bulk of 2.8 cm$^3$/g. At the same time, the tear index in a paper with 33% cellulose (pine sulphate) fell to 24, whereas the wet tear index stopped at 4. After a month's storage of the foam, the tearing resistance indexes for a corresponding paper composition had fallen to 12 and it was no longer possible to determine the wet tear index (less than 1). At the same time, the bulk increased to 3.4.

EXAMPLE 3

A. The following experiment was carried out to show how it is possible to add a bonded latent sulphonic acid curing agent together with methylol active components to the surface of the foam fragments and there cause them to react during the build-up of a new fibre structure. The same foam as in Example 1 without kaolin was taken and beaten after 3 months' storage, without cellulose. To the fine suspension was added a resin solution of the original Casco resin "Svedorit" which was provided with 10% Napyrosulphite calculated on the weight of the resin. This gives a sulphonic acid-modified resin solution which is soluble on dilution on the alkaline side but sparingly soluble to insoluble at neutral and acidic pH. In total, 40% of sulphite-modified Svedorit was added, calculated on the dry weight of the foam fragments, and the product was deposited for 3 h on the foam fragments at pH 6, the pulp being filtered and washed. Analysis showed that the fragments had absorbed something above 30% of the sulphited resin and, thus, consisted of approx. 75% foam fragments and 25% absorbed sulphite-modified resin with relatively high methylol activity. The pulp was then mixed with cellulose in the proportions 33% cellulose and 67% carbamide resin composition. The pH of the stock was adjusted at 5.5 and paper sheets were formed on a laboratory scale. The pH of the paper kept at 5.5 during the drying. The following tearing resistance was obtained: Dry tear index 32, Wet tear index 16 An addition of a methylol-rich compound to the surfaces of the foam fragments at this pH has, thus, but a limited effect on the formation of an effective fibre structure.

B. In order to reinforce the effect of the added methylol-rich compound, the sulphite-modified Casco resin was deposited on the foam fragments with diluted sulphuric acid at pH 1.5 for 30 min. at room temperature. The pulp which had now absorbed 90% of sulphite-modified resin was washed and mixed with cellulose in the proportion 33% cellulose and 67% carbamide resin product. Paper sheets were formed from the pulp partly at the pH which adjusted itself, namely 5.0; and partly at adjusted pH values of 6.5 and 2.5, respectively, the latter being adjusted by a dosage of oxalic acid. The following tearing resistance values were obtained:

| Secondary Stock | Dry tear index | Wet tear index | Paper pH |
| --- | --- | --- | --- |
| pH 6.5 | 60 | 36 | 3.8 |
| pH 5.0 | 60 | 32 | 3.8 |
| pH 2.5 | 56 | 36 | 3.0 |

By the addition of resin emulsion with high methylol content and an inner latent curing agent as well as activation by means of acid treatment, a satisfactory formation of the fibre structure was thus obtained during the drying. It is noteworthy that the pH of the pulp and the sheet is of no great importance when the material, prior to sheet formation, is subjected to an acid treatment at pH 1.5. This probably depends on the fact that the sulphite anionic resin functions as a solid cation exchanger but first during the drying. The acid treatment realized the acidic modification of the polymeric sulphonic acid and this has a catalytic effect on the methylol reaction, even if the stock shows pH values of 5.0 to 6.5.

EXAMPLE 4

This Example illustrates the drying conditions.

In order to illustrate the importance of the drying temperature, several paper sheets were formed in accordance with Example 3B at pH 5.0. In earlier Examples, the paper had been dried against roller surfaces at a temperature of from 115° to 125° C. Now, a few sheets were removed and dried against a roller surface which, on the commencement of the the drying operation, was at 70° C., and at the end of the process, 95° C. The tear indexes which were then obtained were slightly poorer, which thus shows that the temperature, like the pH, is of importance for the methylol reactions and the build-up of an effective network structure.

| Stock pH | Drying temperature | Dry tear index | Wet tear index |
|---|---|---|---|
| 5 | 70°–95° C. | 40 | 16 |

The best result was obtained when the still wet paper sheet was exposed to a surface temperature of 120° C. between two glazing plates so that the water loss was delayed for 1 min., the plates being then removed.

| Stock pH | Curing temp. | Drying temp. | Dry tear index | Wet tear index |
|---|---|---|---|---|
| 5 | 120° C. | 120° C. | 72 | 44 |

EXAMPLE 5

For the purposes of exemplifying a latent curing agent with is not chemically bonded to carbamide resin but insoluble in the water of the paper stock and which is converted to a more acidic, catalyzing substance during the paper drying, a special Al phosphate was selected. The insoluble Al phosphate was produced by depositing Al phosphate from a solution of Al sulphate and phosphoric acid at a pH of 3.8 to 4.0. This deposition was added to a stock of inactive foam according to Example 1, stored for 3 months. The amount of Al phosphate which was added corresponded to about 1% Al calculated on the weight of the foam fragments. From the stock which had a pH of 5, paper sheets were formed once cellulose had been added corresponding to 33% cellulose, 67% foam fragments. The following tear indexes were obtained:

| Dry tear index | Wet tear index | Paper pH |
|---|---|---|
| 52 | 20 | 3.8 |

EXAMPLE 6

This example illustrates urea resin fragments obtained by the precipitation of U-F condensate with low F/U ratio and low condensation degree on kaolin filler and the use of such modified kaolin pulp as active fragments in paper manufacture.

60 g kaolin (intended for the stock additive) was carefully slurried in 60 ml water and will be called hereinbelow suspension A.

12 g urea was dissolved in 16 ml 35% formaline and heated to 80° C. for 30 min., the pH being kept constant at 7 by adjustment with soda lye. This corresponds to 200 meq. urea and 200 meq. formaldehyde, F/U=1.0. After 30 min., 2.2 ml 25% ammonia solution was added which had first been reacted with 8 ml formaline solution to hexamethylene tetramine, and phosphoric acid was added so that the pH was 7.5. The combined solution still contained 200 meq. urea but 300 meq. formaldehyde and 30 meq. ammonia. Since the latter can be expected to bond 45 meq. formaldehyde, the new F/U would be 255/200=1.27. After a further 15 min. condensation at pH 7 this solution was poured into suspension A which was strained to remove coarser particles. P Oligomer silicic acid was produced in that 17 ml of water-glass containing 6 g $SiO_2$ (100 meq.) was diluted to 35 ml and poured into 45 ml 2-molar phosphoric acid. The thus obtained solution of oligomer solicic acid, phosphoric acid and phosphates had a pH of 1.5. To this was added, under agitation, the combined, strained suspension A, the pH becoming 4.5. After a few hours at room temperature a thickening takes plate to paste because of precipitation of U-F condensate and silicic acid, hydrogen bonded to each other. The paste can easily be redispersed to a liquid suspension. It is about 37.5% with respect to dry substance and once again becomes fluid at about 20%.

After a few days' storage, the paste was stirred out with 200 ml sulphate solution with 1% $Al_2O_3$ (20 meq. Al per 100 ml), thus 40 meq. Al. The pH then fell heavily to about 1.5, at which pH the suspension was allowed to acid cure at room temperature for 1 h.

The thus cold acid-cured suspension with about 80 g dry substance was added to a concentrated stock of wood fibres (thermomechanical pulp) and pH was adjusted to 4.8. Once the stock had been allowed to "mature" for a couple of hours, it was run out onto a wire and formed to paper which was dried at a roller temperature of 125° C.

The wood fibre content of the stock had been adjusted to 80 g, for which reason the obtained paper should have a composition corresponding to 50% thermomechanical pulp and 50% urea resin fragments in the form of 75% kaolin encapsulated with 25% U-F condensate. The obtained sheet weight was 160 g, for which reason retention was almost 100%.

Normally, paper with such high contents of kaolin and filler cannot be manufactured, but in this case it worked and the wet paper web displayed a good level of strength.

The finished urea kaolin paper had a tear index of 75 in the dry state and 35 in the wet state. The breaking length of the paper was 2.450 m. In view of the high contents of inorganic filler, these values are very good.

EXAMPLE 7

This Example illustrates the manufacture of paper on a technical scale, utilizing all of the inventive phases.

A carbamide resin with F/U=2 delivered as a powder from BASF, Germany, was dissolved in water with an addition of 12% urea for 48 h (F/U=1.7). To the resin solution was added, just before the foaming, 25% kaolin B as a 30% suspension in water containing 3% commercial water-glass solution ($SiO_2/Na_2O=3.3$). The concentration of the resin solution was 32% total dry content and its pH was 9.5 when it was converted in a conventional foaming machine (which is normally used for insulation purposes) to an acid-cold-cured foam with the assistance of a 4% phosphoric acid and a tenside (butyl naphthene sulphonate). In order to compensate for the alkalinity of the resin solution with kaolin and water-glass, the phosphoric acid was added in a dose such that the pH of the foam became 1.8, which required more acid than normally for the foam formation. Two foam portions were removed, one with a dry density of 15 kg/m³ and the other with slightly more than 30 kg/m³. Both portions had a water content of from 75 to 80%. After 48 h storage at 5 to 10° C., both the foam portions were pulped in a hydropulper with equal amounts (dry weight) of pine sulphate cellulose (Iggesund). The pH of the two portions was then approx. 1.9 for the higher density and 2.1 for the lower, although with considerable local variations.

A generous amount of Al sulphate was added to the stock, or 4% of the dry weight. Thereafter, the stock was supplied with sizing substances. In the case with high foam density, 4% alkaline pine sulphate resin was added and in the case with the lower foam density, 2% pine sulphate resin was added, together with 3% of an acrylate polymer in latex form which was deposited on the fibre material with the assistance of Al sulphate. The large amounts of Al sulphate were added not only to precipitate the sizing substances but also to precipitate the phosphoric acid from the foam production to Al phosphate which was to serve as an inner latent curing agent. The great amounts of sizing substances were added because the paper machine was not equipped for particularly high pressure and the sizing substances contributed to keeping the paper compact during the drying despite limited pressure. No other attempts were made to neutralize the acidity of the primary pulp suspension, which correspond to pH values of 3.4–4.2, hence suitable for the precipitation of Al phosphates. After the primary pulping, the pulp was filtered off and pulped again to remove the ten sides which disturb the paper formation. In the secondary pulp suspension, the pH was adjusted by an addition of Al sulphate to 4.3.

The pulp was then run out on a paper machine. No particular machine setting was required, although the first drying rollers were also set at maximum temperature, which corresponded to a surface temperature of 135° C., and a very dense drying felt was used, these measures being adopted to realize a high "curing-drying temperature" while the paper was still wet. Finally, the machine was run at a relatively low speed of 75 m/min. in order that the paper would have time to dry in the extant drying zone, whereupon it was calendered.

From the foam with high density (30 kg/m$^3$) a relatively thick paper was manufactured with a surface weight of 120 g/m$^2$, whereas the foam with lower density was used for paper with surface weights of 60 and 90 g/m$^2$, respectively. The pH value of the finished paper was checked. Generally speaking, pH levels of between 3.0 and 3.5 were noted, but higher deviating values were obtained when the dry section was loaded so heavily that the paper was advanced out in moist, not fully dried out form.

The paper of foam with a density of 15 kg/m$^3$ and a surface weight of 90 g/m$^2$ displayed the following data:

| | |
|---|---|
| Surface weight | 90 to 95 g/m$^2$ |
| Bulk | 1.3 cm$^3$/g |
| pH dried paper | 3.0 |
| Dry tear index | 120 |
| Wet tear index | 92 |
| Dry breaking length | 5000 m (mean value) |
| Wet breaking length | 3000 m (mean value) |
| Dry stretch at break | 4% |
| Dry breaking length transverse direction | 3500 m |
| Burst index | 320 |

The paper of foam with a density of 30 kg/m$^3$ and surface weight 120 g/m$^2$ displayed:

| | |
|---|---|
| Surface weight | 120–125 g/m$^2$ |
| Bulk | 1.7 cm$^3$/g |
| pH, dry paper | 3.4 |
| Dry tear index | 96 |
| Wet tear index | 80 |
| Dry breaking length | 2500 m |
| D:o transverse direction | 1400 m |
| Wet breaking length | 1200 m |
| Dry stretch at break | 5–7% |
| Burst index | 160 |

The printability properties of the paper as well as its optical properties were excellent. The lightness was at SCAN 90 despite the fact that the sulphate resin used and certain other impurities negatively affected the whiteness.

What we claim and desire to secure by Letters Patent is:

1. Method of producing a semisynthetic paper of low bulk, comprising the steps of:
    foaming a solution of urea-formaldehyde condensate;
    precuring said foamed solution at a temperature between 5° and 60° C. to form a solid, non-tacky foam;
    disintegrating said foam into particles having a major dimension of 100 to 1000 μm;
    forming a stock from said particles and cellulosic vegetable fibres having a pH between 3 and 7;
    including in said stock a water-insoluble latent heat-sensitive acidifier;
    forming a paper web from said stock; and
    drying said paper web at a temperature between 80° and 140° C., said latent acidifier being thereby activated for shifting the pH of said web to a pH between 1.5 and 4.5 such that said particles in said web are cured a second time under the formation of a continuous, chemically bonded fibre network structure of said particles and said fibres.

2. Method according to claim 1 further comprising the step of pressing said paper web in conjunction with said drying.

3. Method according to claim 1, further comprising the step of adding mineral particles selected from the group of kaolin and talc to said solution of urea-formaldehyde condensate before the foaming step.

4. Method according to claim 1, further comprising the steps of forming a suspension of mineral particles selected from the group of kaolin and talc in water containing water-glass, and adding said suspension to said solution of urea-formaldehyde condensate before the foaming step.

5. Method of producing a semi-synthetic paper of low bulk, comprising the steps of:
    forming particles of precured urea-formaldehyde condensate from a solution of urea-formaldehyde condensate, precured at a temperature below 60° C. such that said condensate has lost its fluidity and tackiness, said particles having a major dimension between 1 to 1000 μm;
    coating the surface of said particles with urea-formaldehyde condensate of a lower curing degree and a higher methylol reactivity than said particles themselves;
    forming a stock of said particles and cellulosic vegetable fibres, said stock having a pH between 3 and 7;
    including in said stock a water-insoluble latent heat-sensitive acidifier;
    forming a paper web from said stock; and
    drying said paper web at a temperature between 80° and 140° C., said latent acidifier being thereby activated for shifting the pH of said web to a pH between 1.5 and 4.5 such that said particles in said web are cured a second time under the formation of a continuous, chemically bonded fibre network structure of said particles and said fibres.

6. Semisynthetic paper with low bulk comprising a continuous fibre network structure formed by cellulosic vegetable fibres and by solid particles of urea-formaldehyde condensate foam, said particles constituting 10–90% by weight of the paper and having a major dimension between 1 and 1000 μm, and said network structure being chemically bonded in that said particles, which have been formed from a urea-formaldehyde condensate foam precured at a pH from 1 to 3.5 and a temperature between 5° and 60° C. and disintegrated into a stock of said particles at pH 3 to 7 before losing its capacity of curing a second time and before being mixed with said cellulosic fibres, have been cured a second time in combination with said fibres in connection with drying of the paper at a pH between 1.5 and 4.5 and a temperature between 80° and 140° C.

7. Semisynthetic paper according to claim 6, wherein said vegetable fibres are a member of the group consisting of chemical, semichemical and mechanical wood pulp.

8. Semisynthetic paper according to claim 6, wherein mineral particles selected from the group of kaolin and talc are included as a filler in said particles of urea-formaldehyde condensate foam.

9. Semisynthetic paper according to claim 8, further comprising a surface coating on said mineral particles, said surface coating consisting of an insoluble, ionic, active silicic acid.

10. Semisynthetic paper according to claim 6, wherein said paper is compressed during curing said second time.

11. Semisynthetic paper with low bulk comprising a continuous fibre network structure formed by cellulosic vegetable fibres and by solid particles of urea-formaldehyde condensate, said particles constituting 10–90% by weight of the paper and having a major dimension between 1 and 1000 μm, and said network structure being chemically bonded in that said particles, which are formed by one urea-formaldehyde condensate and are partially precured to a solid water-insoluble state under acidic conditions and a temperature between 5° and 60° C. before being mixed with said cellulosic fibres and which have, on their surface, a precipitate of another urea-formaldehyde condensate with a lower curing degree and higher methylol reactivity than said one urea-formaldehyde condensate, have been cured a second time in combination with said fibres in connection with drying of the paper at a pH betweeN 1.5 and 4.5 and a temperature between 80° and 140° C.

* * * * *